US007629972B2

(12) United States Patent
Yoo et al.

(10) Patent No.: US 7,629,972 B2
(45) Date of Patent: Dec. 8, 2009

(54) IMAGE-BASED PROTRUDED DISPLACEMENT MAPPING METHOD AND BI-LAYERED DISPLACEMENT MAPPING METHOD USING THE SAME

(75) Inventors: Byoung Hyun Yoo, Daejeon (KR); Soon Hung Han, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 524 days.

(21) Appl. No.: 11/510,255

(22) Filed: Aug. 24, 2006

(65) Prior Publication Data

US 2007/0195083 A1    Aug. 23, 2007

(30) Foreign Application Priority Data

Feb. 20, 2006   (KR) ...................... 10-2006-0016031

(51) Int. Cl.
G06T 15/00   (2006.01)
(52) U.S. Cl. ...................... 345/420; 345/419; 345/426; 345/609
(58) Field of Classification Search ................ 345/419, 345/420, 426, 609
See application file for complete search history.

(56) References Cited

U.S. PATENT DOCUMENTS

| | | | | |
|---|---|---|---|---|
| 5,224,208 | A | * | 6/1993 | Miller et al. ................. 345/609 |
| 7,196,702 | B1 | * | 3/2007 | Lee et al. ..................... 345/419 |
| 7,408,550 | B2 | * | 8/2008 | Bunnell ....................... 345/426 |
| 7,453,455 | B2 | * | 11/2008 | Park et al. ................... 345/419 |

OTHER PUBLICATIONS

Cook, Shade Trees, ACM SIGGRAPH Computer Graphics, Jul. 1984, pp. 223-231.*
Blinn, Simulation of Wrinkled Surfaces, ACM SIGGRAPH Computer Graphics, Aug. 1978, pp. 286-292.*

(Continued)

Primary Examiner—Phu K Nguyen
(74) Attorney, Agent, or Firm—KEvin D. Jablonski; Graybeal Jackson LLP

(57) ABSTRACT

The present invention relates, in general, to technology applied to entertainment information devices, such as video game machines or computer game programs, information devices for representing geo-spatial information, or information devices for performing three-dimensional rendering using computer graphics and, more particularly, to a protruded displacement mapping method, which represents an object as protruding from a surface. In the image-based protruded displacement mapping method of the present invention, an intersection point search step of searching for an intersection point of a surface of a protruding object, defined by the displacement information, and an observers sight line, and displaying the shape of the protruding object on the polygonal surface, is performed. An overflow representation step of adding a separate polygonal surface and representing a shape of the protruding object, corresponding to overflow deviating from a boundary of the polygonal surface, on the added polygonal surface, is performed. A steeply inclined surface step of detecting a steeply inclined surface in the shape of the protruding object is performed. A steeply inclined surface correction step of representing an additional texture on the steeply inclined surface is performed.

27 Claims, 10 Drawing Sheets

OTHER PUBLICATIONS

Risser, Rendering 3D Volumes Using per-pixel Displacement Mapping, 2007, pp. 81-87.*

Policarpo et al., Real-time Relieft Mapping on Arbitrary Polygonal Surfaces, Symposium on Interactive 3D Graphics, 2005, pp. 155-162.*

Wang et al., Genaralized Displacement Maps, Microsoft Research Asia, Eurographics Symposium on Rendering, 2004, pp. 1-8.*

Karhu, Displacement Mapping, Tik-111.500 Seminar on computer Graphics, Helsinki University of technology, Apr. 2002, pp. 1-15.*

Wang et al., View-Dependent Displacement Mapping, ACM Transaction on Graphics, Jul. 2003, pp. 334-339.*

* cited by examiner

IMAGE-BASED PROTRUDED DISPLACEMENT MAPPING METHOD AND BI-LAYERED DISPLACEMENT MAPPING METHOD USING THE SAME

CROSS-REFERENCE TO RELATED APPLICATION

This is application claims benefit, under 35 USC §119, of co-pending Korean Patent Application No. 2006-16031 filed 20 Feb. 2006 which is incorporated herein by reference.

BACKGROUND OF THE INVENTION

1. Field of the Invention

The present invention relates, in general, to technology applied to entertainment information devices, such as video game machines or computer game programs, information devices for representing geo-spatial information, or information devices for performing three-dimensional rendering using computer graphics and, more particularly, to a protruded displacement mapping method, which represents an object as protruding from a surface, and to a bi-layered displacement mapping method, which uses together such image-based protruded displacement mapping technology and typical shape-based displacement mapping technology in combination with each other.

2. Description of the Related Art

In the computer graphic fields, methods of representing the details of the surface of an object using the concepts of bump mapping, proposed by Blinn and disclosed in "Simulation of Wrinkled Surfaces" published in Proceedings of International Conference on Computer Graphics and Interactive Techniques, pp. 286-292, 1978, and displacement mapping, proposed by Cook and disclosed in "Shade Trees", published in Proceedings of International Conference on Computer Graphics and Interactive Techniques, pp. 223-231, 1984, have been proposed.

The methods of representing the details of the surface of an object, proposed in the prior art, are classified into a triangle mesh generation method, based on shapes, and a displacement mapping method, based on images.

The triangle mesh generation method is a method of representing the details of the surface of an object by generating a large number of micro-polygons, and is problematic in that it is difficult to apply the triangle mesh generation method to an interactive program because a large number of micro-polygons is generated. In order to solve the problem, several methods of representing the displacement of the surface of an object without performing explicit rendering using micro-polygons have been proposed. As the proposed methods, there are a ray tracing method, a three-dimensional reverse image warping method, a three-dimensional texture mapping method, a method of previously calculating visible information, etc. Of these methods, the ray tracing method and the reverse image warping method are not suitable for real-time applications because the amount of computational work is large. The three-dimensional texture mapping method is problematic in that, since polygons having two-dimensional textures are layered to perform displacement mapping, unnatural results may be obtained depending on the viewpoint. Further, the method of previously calculating visible information is problematic in that a large amount of memory must be used to store a sample for a five-dimensional function.

The image-based displacement mapping method is the method of representing the details of the surface of an object without generating micro-polygons, and uses a technique of simplifying or reproducing a ray-tracing method. However, such conventional methods all represent the detailed shape of the surface of an object using a method of depressing the bottom of the object downwards from a polygonal surface rather than protruding the object surface upwards from the polygonal surface.

FIG. 1 is a view showing the concept of a conventional image-based displacement mapping method. In FIG. 1, reference numeral 101 is an actual polygonal surface, reference numeral 102 is the depth from the actual polygonal surface to the object surface, reference numeral 103 is the height from a bottom surface to the object surface, and reference numeral 104 is a viewpoint.

In the prior art, in a virtual space implemented with the displacement map of an object, since the polygonal surface is placed uppermost, the height 103 actually represents the depth of the object, not the height of the object. The conventional methods are suitable for representing shapes depressed from the polygonal surface, which is a reference surface, but entail several problems when representing shapes protruding from the polygonal surface.

FIGS. 2A to 2D are views showing the problems of the conventional image-based displacement mapping method. In detail, FIG. 2A illustrates the rendering of a texture, in which a polygonal surface and a displacement map are not considered, FIGS. 2B and 2C illustrate the rendering of a texture, in which a polygonal surface and a displacement map are considered, and FIG. 2D illustrates the rendering of a texture, in which a polygonal surface and a displacement map are considered, and the processing of the surroundings thereof.

As shown in FIG. 2A, if a texture T, in which a polygonal surface P and a displacement map are not considered, is rendered, the height of an object is not considered in the rendered results.

If a displacement map is applied to the texture of FIG. 1A using the conventional image-based displacement mapping method, a bottom surface is depressed downwards, as shown in FIGS. 1B and 1C, and thus a region B, from which texture information is omitted, is generated near the boundary of the polygonal surface. When the height of the object is intended to be represented higher, the bottom surface of the object must be further depressed from the polygonal surface, so that the region B, from which information is omitted, is widened as the height of the object is increased (the information-omitted region of FIG. 1C is wider than that of FIG. 1B).

The problems of the conventional image-based displacement mapping method are summarized as follows. Since a bottom surface is depressed downwards from a polygonal surface without causing a texture to protrude upwards from the polygonal surface, the location of actual details varies due to the depression of the bottom surface. Further, as the bottom surface is depressed downwards, the bottom surface is moved further away from a person's viewpoint, so that a phenomenon in which the bottom surface is contracted occurs.

Because of the above problems, the conventional image-based displacement mapping method is problematic in that a bottom surface is depressed from a polygonal surface, the same file shapes are repeatedly arranged, as shown in FIG. 2D, and it is difficult to represent details of the surface of an object except for the case where the object is not high.

SUMMARY OF THE INVENTION

Accordingly, the present invention has been made keeping in mind the above problems occurring in the prior art, and an object of the present invention is to provide a method of representing the details of the surface of an object, which allows an object surface to protrude from a reference surface (polygonal surface) representing an object, without modifying the reference surface or adding micro-polygons to the reference surface.

Another object of the present invention is to provide a method of processing overflow, which processes overflow that deviates from a polygonal surface (reference surface) when a texture protrudes from the reference surface.

A further object of the present invention is to provide a bi-layered displacement mapping method, which uses together a shape-based displacement mapping method for representing the details of the surface of terrain, and an image-based protruded displacement mapping method for representing the details of a building protruding from the terrain in combination with each other.

In order to accomplish the above objects, the present invention provides an image-based protruded displacement mapping method in a system for representing a shape of an object protruding from a polygonal surface using a three-dimensional object, texture information and displacement information, comprising an intersection point search step of searching for an intersection point of a surface of a protruding object, defined by the displacement information, and an observer's sight line, and displaying the shape of the protruding object on the polygonal surface; an overflow representation step of adding a separate polygonal surface and representing a shape of the protruding object, corresponding to' overflow deviating from a boundary of the polygonal surface, on the added polygonal surface; a steeply inclined surface step of detecting a steeply inclined surface in the shape of the protruding object; and a steeply inclined surface correction step of representing an additional texture on the steeply inclined surface.

Further, the present invention provides a bi-layered displacement mapping method in a system for representing a shape of each object using a three-dimensional object, texture information, global displacement information and local displacement information, comprising a global displacement mapping step of representing the surface of the object based on a polygon using the three-dimensional object and the global displacement information; a local displacement mapping step of representing detailed shapes of the object using the texture information and the local displacement information; an occlusion solution step of arranging objects, for which the global displacement mapping and the local displacement mapping have been performed, in a sequence of distances to a viewpoint; and a tangent space correction step of equalizing heights of tangent spaces between adjacent polygons at the global displacement mapping step.

Further, the present invention provides a method of processing overflow, which deviates from a boundary of a polygonal surface in a computer graphic system for displaying a shape of a protruding object on the polygonal surface, comprising the steps of adding a surface perpendicular to the polygonal surface at a boundary of the polygonal surface at which the overflow occurs depending on a direction of the sight line; and representing the shape of the protruding object corresponding to the overflow on the added perpendicular surface.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
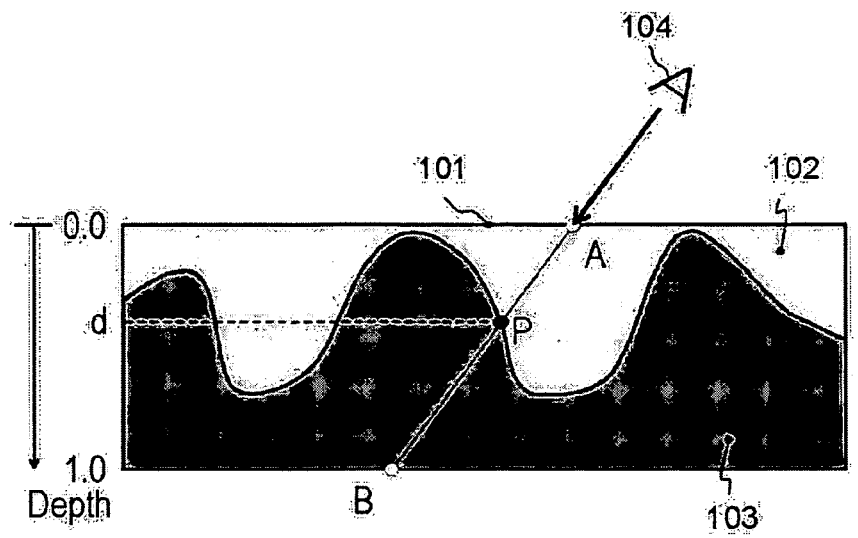
FIG. 1 is a view showing the concept of a conventional image-based displacement mapping method.

Hereinafter, an image-based protruded displacement mapping method and bi-layered displacement mapping method using the displacement mapping method according to embodiments of the present invention will be described in detail with reference to the attached drawings.

Reference now should be made to the drawings, in which the same reference numerals are used throughout the different drawings to designate the same or similar components.

The present invention proposes a method of representing the details of a shape protruding from a reference surface (polygonal surface) representing an object, without modifying or distorting the reference surface. In the present invention, a displacement map for a surface protruding from the reference surface is defined, and protrusion is represented from the displacement map using a ray-tracer. In order to solve the problem of the overflow of displacement occurring at the boundary of a protruding object, two surfaces are added to the reference surface, and thus the silhouette of the object is represented.

Before the description of the present invention, the terms used in the present invention are described.

rendering: this refers to a procedure of obtaining a two-dimensional image from a three-dimensional model through a series of graphic pipelines, which is the meaning generally understood in computer graphics fields. Methods of obtaining a two-dimensional image, such as a photograph, from various scene information representing an object, lighting, texture, location, color, etc. include various methods such as a method that can be implemented in real time, or a method of obtaining a still image through calculation performed over a long period. The calculation procedure of obtaining a two-dimensional image or a moving image from a three-dimensional model is designated as rendering.

representation of surface details: this refers to the representation of the texture of the surface of an object, the texture of a detailed shape, not appearing in geometrical information, a shadow according to lighting, and the tactile quality of a detailed shape, such as a protruded or depressed shape, when an object is represented from geometrical information, which is information about the shape of a three-dimensional object (generally, geometrical information means a polygonal model) through a rendering procedure. That is, it refers to an operation of representing a visual texture, such as wrinkles of leather, or the grain of wood, or bending, such as creases, on the smooth surface of a model indicated by a polygon.

representation of surface displacement: this refers to the representation of detailed variation in height, due to wrinkles or texture, from the surface of an object implemented from polygons, in the representation of surface details. For example, when the shape of an animal is modeled by a smooth polygon, the height of wrinkles depressed inwards from the skin, or of protrusions protruding from the skin, is represented by adjusting the detailed height of the surface.

displacement mapping: this is one of the methods of representing the displacement of a surface, and means the representation of the displacement of a surface according to the displacement of respective pixels recorded in a displacement map, on which normal displacements on the surface of the object are recorded, when a polygon, representing an object, is rendered using the displacement map.

displacement map: this refers to a mapping table or raster data in which displacement information about the surface of an object is stored as raster values. Of displacement maps, a map, in which height information is represented, is specifically designated as a height map.

Figure 3:
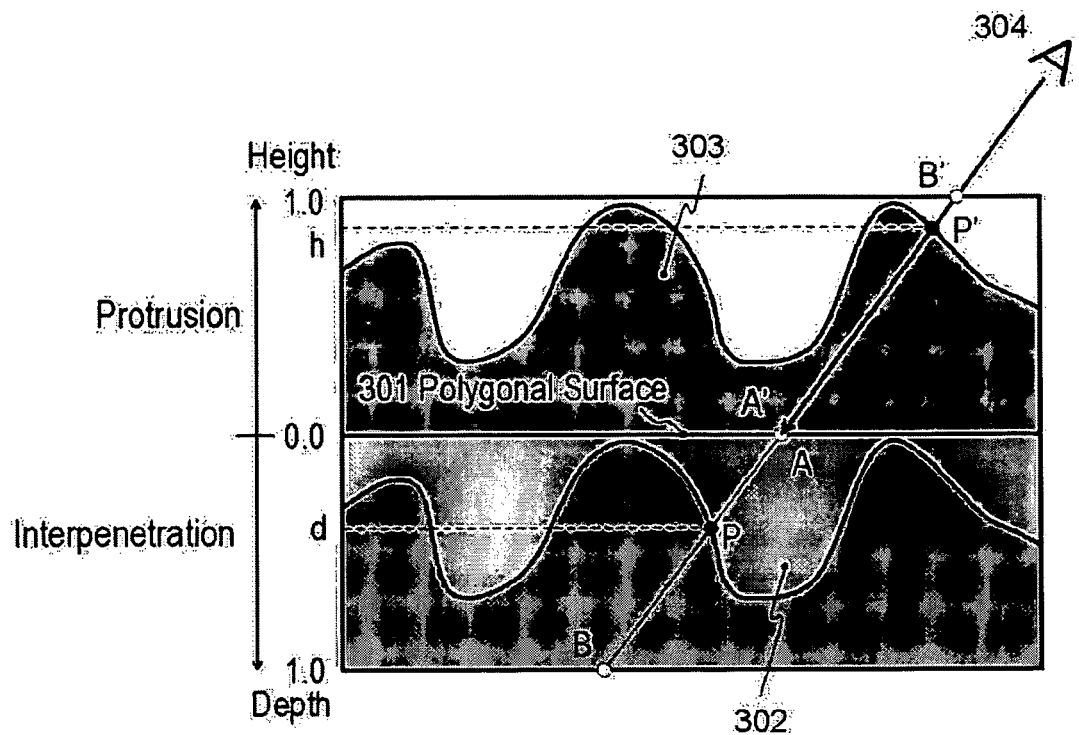
FIG. 3 is a view showing the concept of an image-based protruded displacement mapping method according to the present invention.

FIG. 3 is a view showing the concept of an image-based protruded displacement mapping method according to the present invention. The present invention proposes a method of representing the displacement of the protruding shape so as to represent a shape protruding from a polygonal surface, which is a reference surface. In FIG. 3, reference numeral 301 is a polygonal surface which is a reference surface, reference numeral 302 is the depth from the reference surface to the surface of an object, reference numeral 303 is the height from the reference surface to the surface of an object, and reference numeral 304 is a user's viewpoint.

A displacement map for a shape protruding from the reference surface is defined by representing the height of the polygonal surface, which is the reference surface, by 0, and the maximum height by 1.

In FIG. 3, the pixel to be rendered is point A', placed on the polygonal surface, and the point to be actually shown is point P', protruding by some height. Therefore, in order to render the point A' on the polygonal surface, the point P', at which the viewpoint A'-B' and the surface of the object intersect, must be detected. When the viewpoint A'-B' and the surface of the object intersect several times, the intersection point having the highest displacement is detected, and is taken as the point P'.

That is, in the prior art, the point that must be actually shown at the point A placed on the polygonal surface which is the reference surface is a depressed point P. However, in the present invention, the point that must be actually shown at the point A' placed on the polygonal surface is the protruding point P'.

Figure 4:
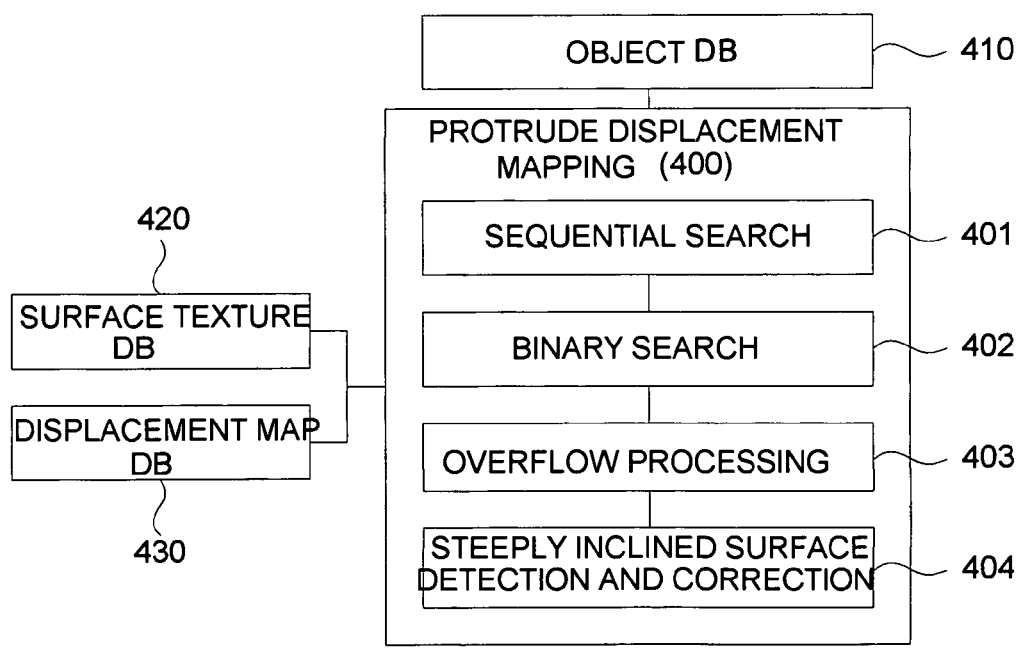
FIG. 4 is a diagram showing the process of an image-based protruded displacement mapping method according to the present invention.

FIG. 4 is a diagram showing the process of an image-based protruded displacement mapping method according to the present invention.

The image-based protruded displacement mapping method can be applied to a typical computer system. A system 400 for such image-based protruded displacement mapping receives three-dimensional object information from an object database 410, and receives surface texture information and local displacement information from a surface texture database 420 and a displacement map database 430, respectively.

The image-based protruded displacement mapping method performed in the system 400 includes a sequential search step 401, a binary search step 402, an overflow processing step 403, and a steeply inclined surface detection and correction step 404. The image-based protruded displacement mapping method can represent steep displacement and details of the surface of an object using a displacement map and surface texture information, without adding micro-polygons.

Hereinafter, respective steps of the image-based protruded displacement mapping method are described in detail.

Sequential Search Step 401

The sequential search step is a procedure for detecting the approximate location of an intersection point between the surface of an object, defined by a displacement map, and a viewpoint. This procedure is described with reference to FIG. 5.

Figure 5:
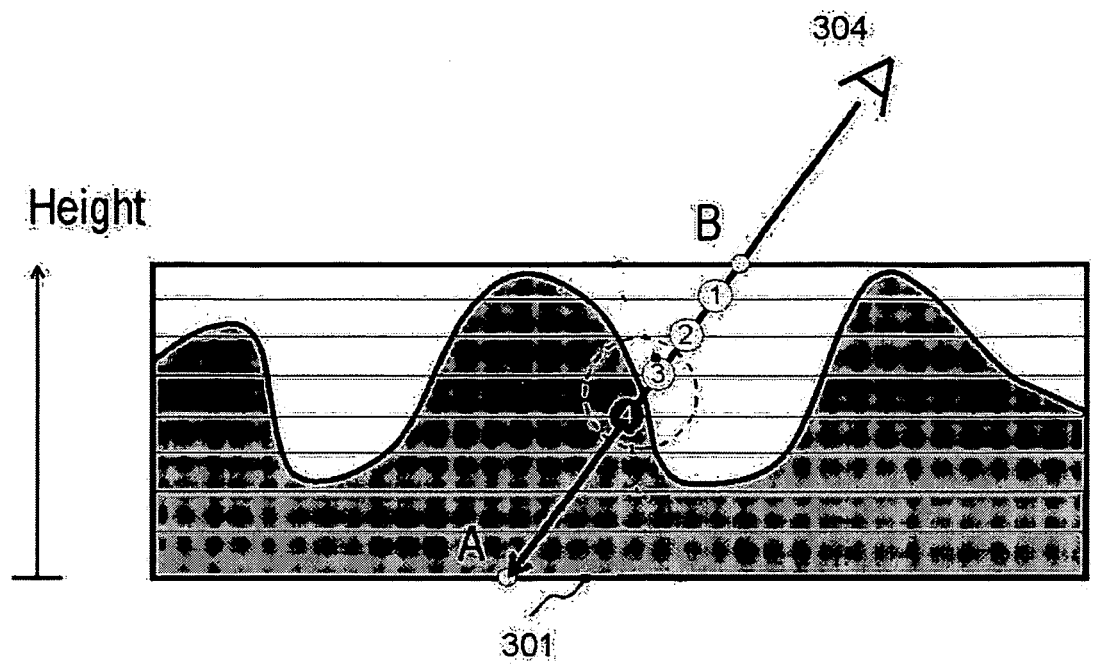
FIG. 5 is a view showing a procedure for detecting the approximate location of an intersection point between the surface of an object, defined by a displacement map, and a viewpoint at a sequential search step.

A region between the top surface of a virtual volume, constructed from a displacement map, and a reference surface is divided into regular intervals, as shown in FIG. 5. With respect to points B and points ① to ④ which the top surface and the divided surfaces of the virtual volume, and a sight line for connecting a viewpoint 304 to the point A to be rendered, intersect, the divided height values from the top surface are gradually compared to height values stored in the displacement map. If a corresponding divided height value is greater than the height value stored in the displacement map, inspection for a subsequent point is continuously performed, whereas if the divided height value is less than the height value stored in the displacement map, the inspection is stopped. For example, in FIG. 5, if the height value at point B, which is the intersection point of the top surface and the viewpoint, is compared to the height value at point B, stored in the displacement map, the height value at the point B is greater than the stored height value, so that an inspection for the subsequent intersection point ① is continuously performed. Since the height value at point ① greater than the height value at point ① stored in the displacement map, the inspection for the subsequent intersection point ② continuously performed. After the inspection has been performed up to the intersection point ③ the height value at the subsequent intersection point ④ less than the height value at point ④, stored in the displacement map, so that the inspection is terminated.

Through this sequential search step, the approximate location of the intersection point of the surface of the object, defined by the displacement map, and a sight line can be detected. In FIG. 5, it can be seen that an intersection point is interposed between points ③ and ④.

Binary Search Step 402

Figure 6:
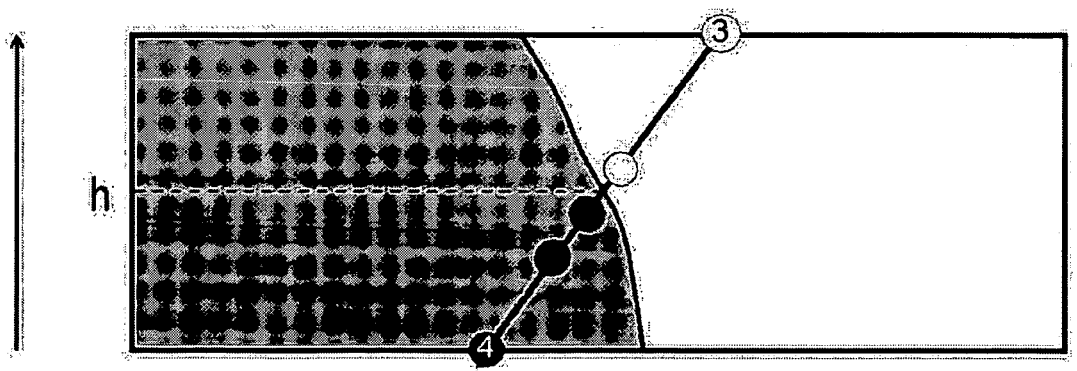
FIG. 6 is a view showing a procedure for detecting the exact location of an intersection point between the surface of the object and the viewpoint at a binary search step.
Figure 7:
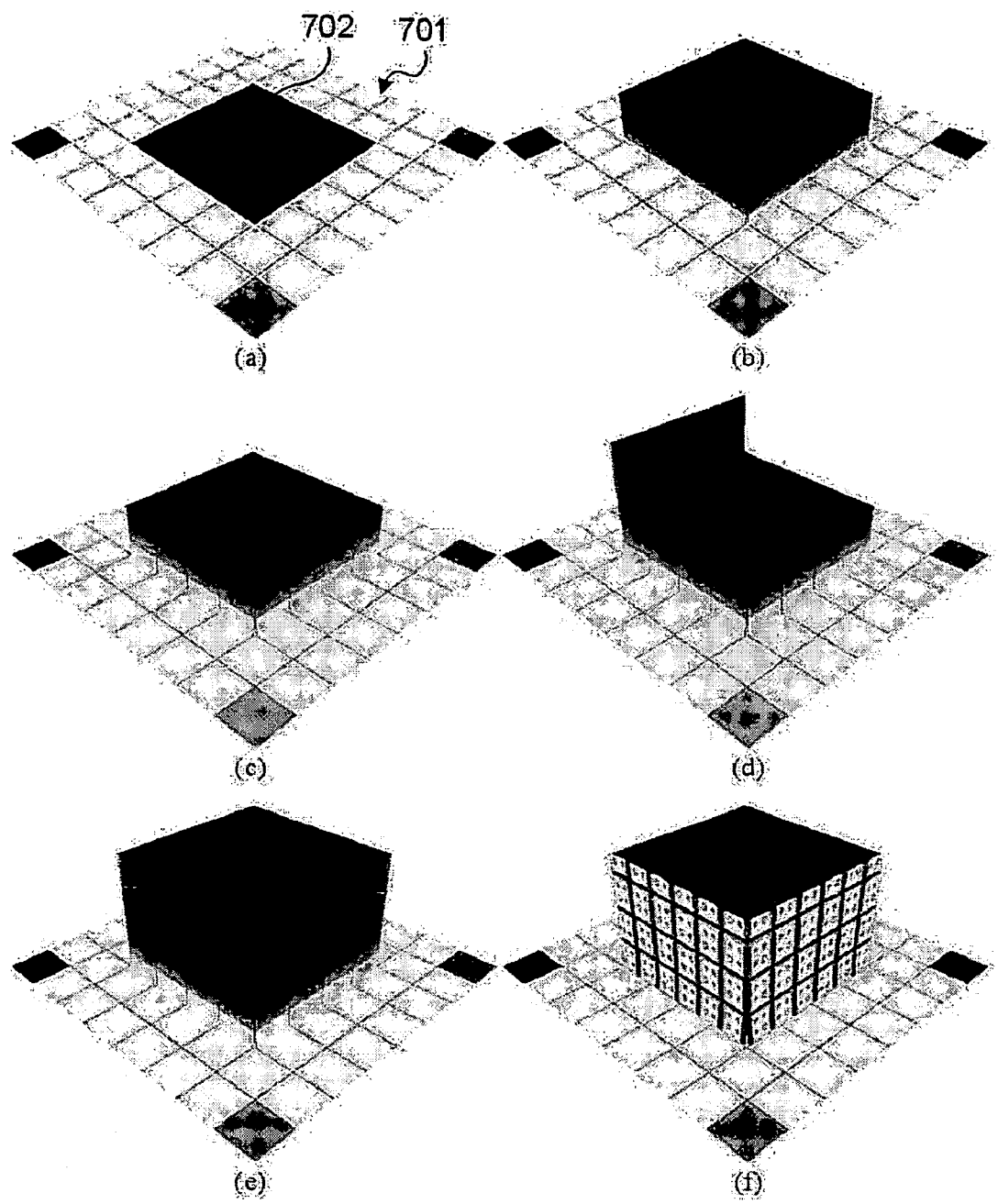
FIGS. 7A to 7F are views showing the procedure for performing three-dimensional rendering on a rectangular polygon using the image-based protruded displacement mapping method of the present invention.

After the approximate location of the intersection point between the surface of the object defined by the displacement map and the viewpoint has been obtained at the above-described sequential search step, information about a more exact height h at the intersection point is obtained by performing the binary search step of FIG. 6. FIG. 6 is a diagram showing a magnified shape of the region between points ③ and ④ of FIG. 5, in which a binary search is performed on the region between points ③ and ④, thus detecting the information about height h at the exact intersection point.

The binary search method performed at the binary search step is described in detail in a paper coauthored by Policarpo, Oliveira, and Comba and entitled "Real-time Relief Mapping on Arbitrary Polygonal Surfaces", published in Proceedings of Symposium on Interactive 3D Graphics, pp. 155-162, 2005.

If the intersection point of the viewpoint and the object surface has been obtained in this way, a texture color value at the corresponding intersection point is read from the surface texture database 420 of FIG. 4 and is represented at the corresponding pixel (point A) on the polygonal surface 301.

Overflow Processing Step 403

FIGS. 7A to 7F are views showing a procedure for performing three-dimensional rendering on a rectangular polygon using the image-based protruded displacement mapping method of the present invention.

FIG. 7A illustrates the results of rendering a texture, in which a polygonal surface and a displacement map are not considered. In FIG. 7A, if a procedure for performing the sequential search step and the binary search step of the present invention, to obtain an intersection point of the surface of an object defined by the displacement map and a viewpoint, to read a texture color value corresponding to the intersection point and to represent the texture color value on the corresponding pixel on the polygonal surface, is repeated, the results of rendering a texture, taking into account the polygonal surface and the displacement map, are obtained, as shown in FIG. 7B.

Figure 2:
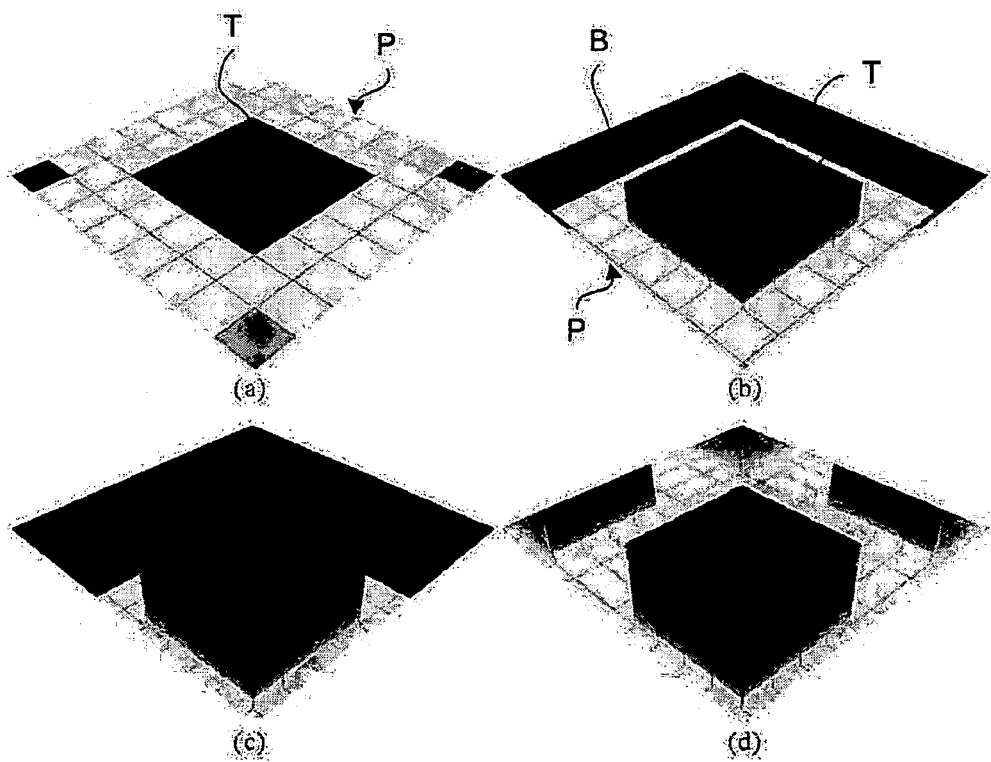
FIGS. 2A to 2D are views showing the problems of the conventional image-based displacement mapping method.

If FIG. 7B is compared to FIGS. 2B and 2C, the results of rendering in FIGS. 2B and 2C show that the bottom surface of an object is distorted while being depressed from a polygonal surface, whereas the results of rendering in FIG. 7B show that the bottom surface has a height of 0, is not modified, and is level with the polygonal surface, and only a box shape protrudes from the polygonal surface to form a shape in which the surface of the object protrudes upwards from the polygonal surface.

Further, as shown in FIG. 7C, even if the height of a texture is represented to be twice as that of FIG. 7B, it can be seen that the bottom surface is level with the polygonal surface and is not modified, and that only the height of a box is increased twice. This can be compared to the case of FIG. 2C, in which distortion of the bottom surface becomes serious as the depression depth increases.

Figure 8:
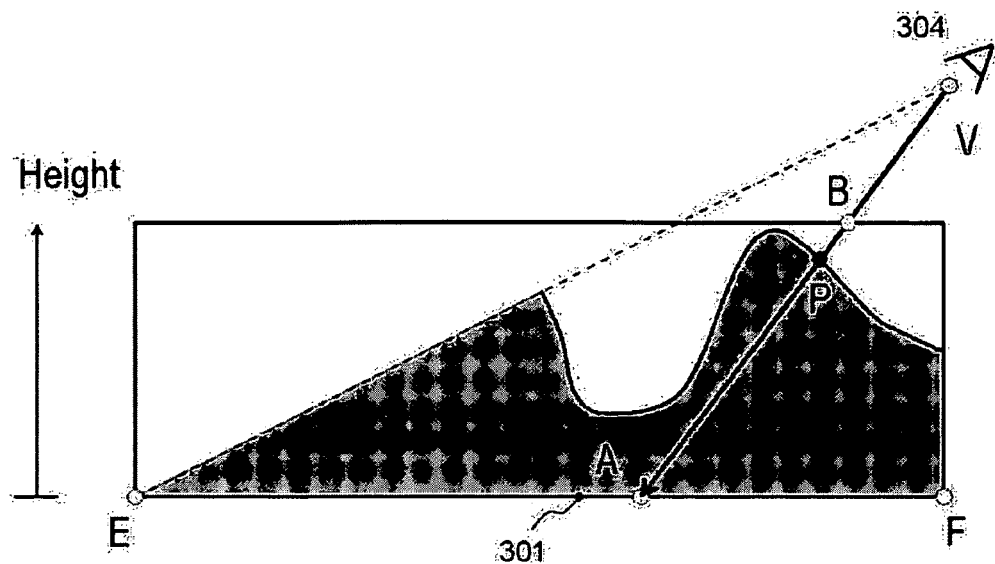
FIG. 8 is a view showing the problem of the overflow of pixel displacement generally occurring in an image-based protruded displacement mapping procedure.

The calculation of protruded displacement mapping according to the present invention is performed in pixels. Accordingly, if a shape protruding from the surface is represented by displacement mapping, a region protruding upwards from a sight line EV deviates from the polygonal surface, as shown in FIG. 8, so that it is impossible to represent the protruding shape using displacement mapping.

Figure 9:
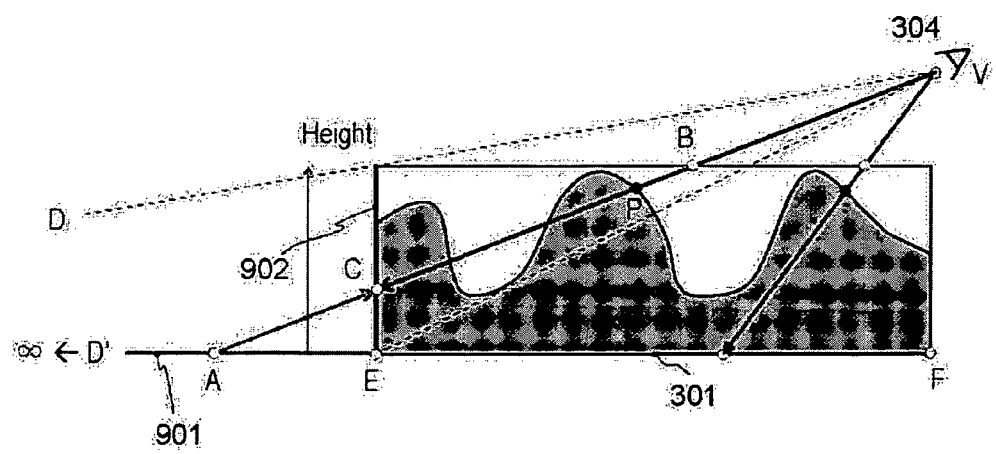
FIG. 9 is a view briefly showing the procedure for solving the problem of the overflow of the displacement of FIG. 8.

For example, in order to represent a point P, existing in the protruding region above the sight line EV of FIG. 9, using displacement mapping, the point P must be represented at point A deviating from the boundary of a polygonal surface E-F. However, actually, in a region placed outside the boundary of the polygonal surface, the calculation of pixel-based displacement mapping is not performed. The problem of such overflow of pixels is a problem which occurs in common in image-based displacement mapping technology. This is why the prior arts represented protruded details in a depression manner.

Therefore, if the problem of overflow of pixels according to displacement is not solved, a problem in which the contour of a protruding shape cannot be accurately represented near the boundary of the polygonal surface, as shown in FIG. 7C, may occur.

The present invention proposes two methods to solve the problem of overflow. The first method is to extend the original polygonal surface E-F, and the second method is to add a surface perpendicular to the original polygonal surface.

Method of Extending Original Polygonal Surface

Since point P in FIG. 9 is placed above a segment EV for connecting the end point E of the polygonal surface to the viewpoint V, displacement mapping is not performed on point P. However, if the polygonal surface E-F of FIG. 9 is extended to E-D', point P can be rendered on point A placed on an extending polygonal surface 901.

Figure 10:
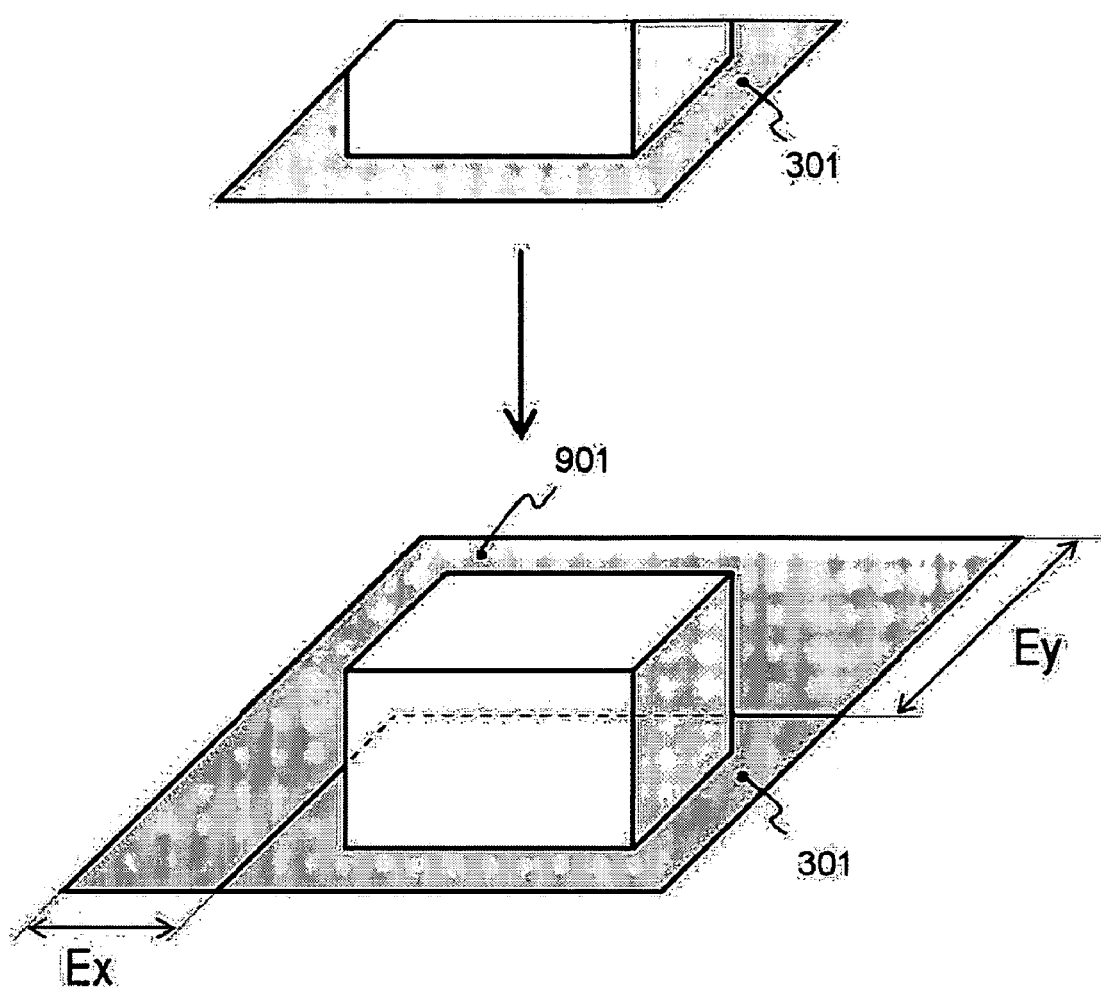
FIG. 10 is a view showing the extension of a polygonal surface to solve the problem of the overflow of displacement.

As shown in FIGS. 9 and 10, the present invention extends a polygonal surface to represent a protruding shape. In order to represent all protruding shapes using a displacement map, the polygonal surface must be extended up to an intersection point D' at which a line VD for connecting the viewpoint V to point D and an extending surface of the polygonal surface E-F intersect. Therefore, the polygonal surface E-F is extended to D'F.

However, as the inclination of a sight line VA viewing point P of FIG. 9 approaches the inclination of the polygonal surface E-F, the location of point A becomes far away from point E, and the location of point D' becomes infinitely far away. Therefore, the lengths Ex and Ey of the extending polygonal surface 901 in FIG. 10 also become infinite. There is a problem in that the resolution of a texture is decreased according to the inclination of a sight line, thus deteriorating image quality.

The method of extending a polygonal surface, as shown in FIG. 10, is advantages in that the number of vertices is not increased, but is disadvantageous in that the extension size must be calculated according to variation in a viewpoint, and image quality may be decreased according to the viewpoint. Further, since both vertex-based calculation and pixel-based calculation should be performed, the implementation of this method in a Graphics Processing Unit (GPU) is limited.

The present invention employs the method of generating an additional surface to solve the above problem.

Method of Adding Perpendicular Surface

Figure 11:
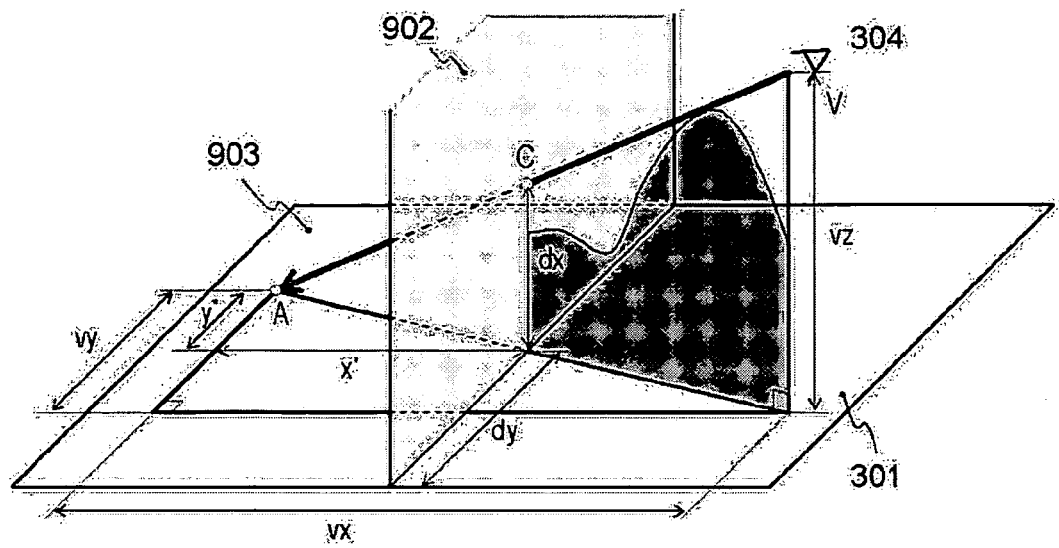
FIG. 11 is a view showing a structure in which the method of solving the problem of the overflow of displacement is extended to three-dimensional space.

FIG. 11 is a view showing the structure of FIG. 9, extending in three dimensions. A sight line at point P of FIG. 9 intersects a surface 902 perpendicular to a polygonal surface EF at point C. Therefore, as shown in FIG. 9, the surface 902 perpendicular to the polygonal surface is added. If texture information about point P is rendered on the pixel C of the perpendicular surface 902, the problem of overflow can be solved. That is, if point C is mapped onto point A, existing on a virtual extending polygonal surface 901 ED', and texture coordinates at point A are used, point C, existing on the perpendicular surface, can be represented using only a single displacement map and a texture.

Component ratio (vx, vy, vz) of the sight line VA of FIG. 11 can be obtained from tangent space coordinates at the viewpoint. The uv space coordinates at point C on the perpendicular surface 902 are represented by dx and dy. If triangular proportion is used on the basis of the relationship therebetween, uv space coordinates at point A (x', y') mapped onto a virtual extending surface 903 can be derived using the following Equation [1], $$x' = \frac{dx \times vx}{vz}, \quad y' = \frac{dx \times vy}{vz} + dy \quad [1]$$

where vx, vy, and vz are tangent space coordinates on the polygonal surface 301, dx and dy are uv space coordinates on the perpendicular surface 902, and x' and y' are uv space coordinates on the virtual extending surface 903. The uv space of the virtual extending surface 903 is defined as uv space warped on the basis of the boundary of the polygonal surface 301.

Figure 12:
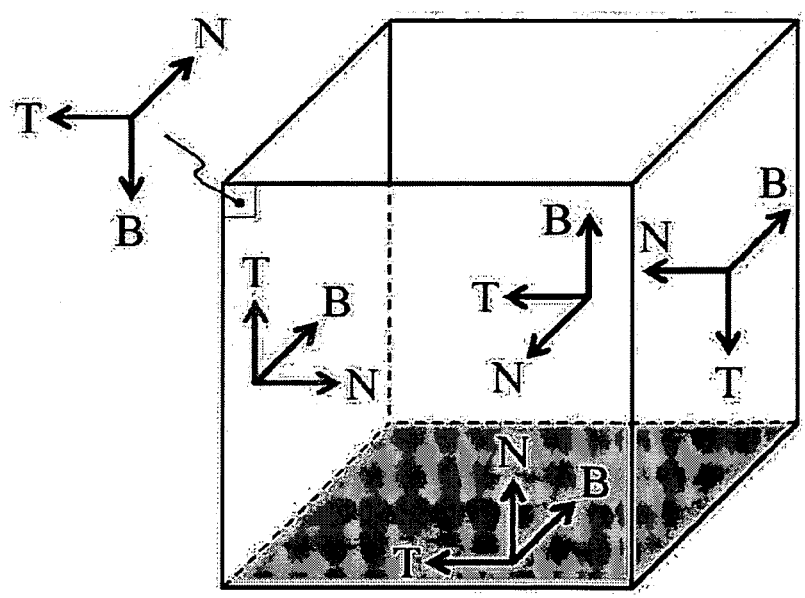
FIG. 12 is a view showing a mapping relationship in a tangent space.

The tangent space coordinates on the perpendicular surface 902 of FIG. 11 can be calculated using the relationship between the tangent space coordinate systems of the polygonal surface and adjacent surfaces, as shown in FIG. 12. If the bottom surface of FIG. 12 is assumed to be a polygonal surface, the tangent space of a left surface perpendicular to the polygonal surface can be transformed as shown in the following Equation [2], normal=−tangent tangent=normal binormal=binormal    [2]

where normal denotes a normal vector, binormal denotes a binormal vector, and tangent is a tangent vector.

If the definition of the tangent space coordinate system of FIG. 12 is used, the mapping of a tangent space is also possible with respect to surfaces adjacent to the polygonal surface in other directions.

Figure 13:
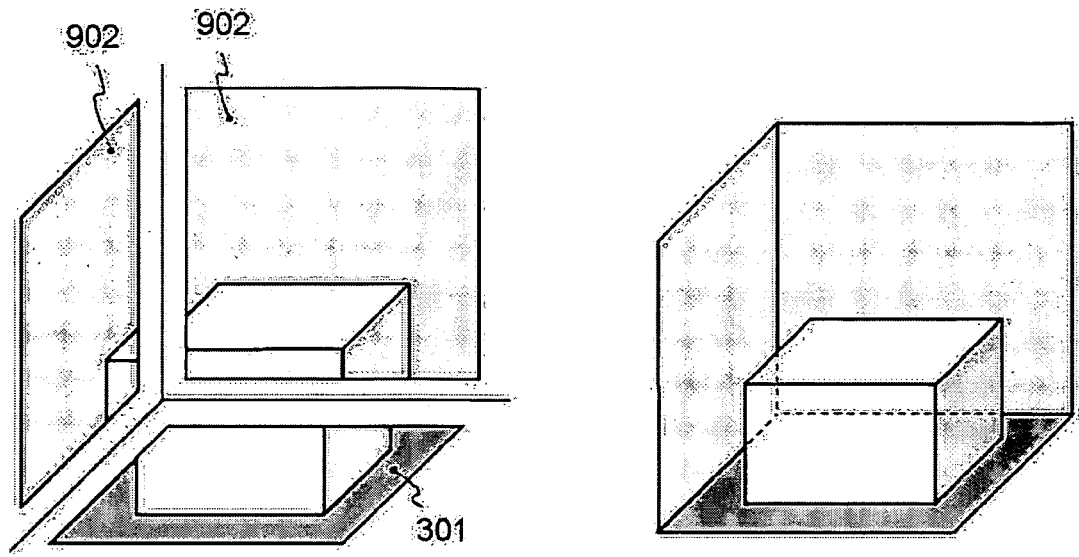
FIG. 13 is a diagram showing the addition of a surface perpendicular to a polygonal surface to solve the problem of the overflow of displacement.

In the present invention, surfaces 902 perpendicular to the polygonal surface are respectively added to be adjacent to the boundaries of the polygonal surface at which overflow occurs depending on the direction of a viewpoint, as shown in FIG. 13. Further, the protruded displacements of an object are represented on the added perpendicular surfaces, so that it is possible to represent the silhouette of overflow, deviating from the region of the polygonal surface.

The rendering of the added perpendicular surfaces is performed by selectively visualizing only a protruding region of an object using alpha blending. The method proposed in the present invention can represent the protruding region of an object using a single texture and a single displacement map by mapping tangent spaces. Therefore, the present invention can represent the silhouette of an object using a small amount of memory, and can represent the exact boundary.

As shown in FIG. 7C, in the case where a contour of a protruding shape is not accurately represented near the boundary of a polygonal surface, the results obtained by rendering overflow, after a single surface, perpendicular to the polygonal surface, has been added to the boundary of the polygonal surface at which overflow occurs, are shown in FIG. 7D. The results, obtained by rendering overflow after two surfaces perpendicular to the polygonal surface have been added to the boundary of the polygonal surface at which overflow occurs, are shown in FIG. 7E. It can be seen through FIG. 7E that a complete silhouette is represented near the boundary of the protruding region.

Steeply Inclined Surface Detection and Correction Step S404

The displacement mapping method of representing a protruding shape proposed in the present invention can also be applied to the representation of objects having protruding shapes and having steep inclinations, in particular, vertically protruding objects such as buildings. The vertically protruding objects have very steep inclinations in the protruding direction, so that a single point on a texture coordinate system may represent a wide region on the height axis. Therefore, it is difficult to obtain high image quality using only a conventional method.

A gentle displacement map is naturally represented because the magnitude of texture coordinates modified by displacement does not generate a large difference with adjacent pixels, whereas the vertically protruding surface of an object may have a distorted texture that greatly increases depending on the viewpoint because the vertically protruding surface is represented by a single point or a single line on the displacement map. Therefore, the method of compensating for distortion is required for the displacement mapping of a protruding shape having a steep inclination.

Figure 14:
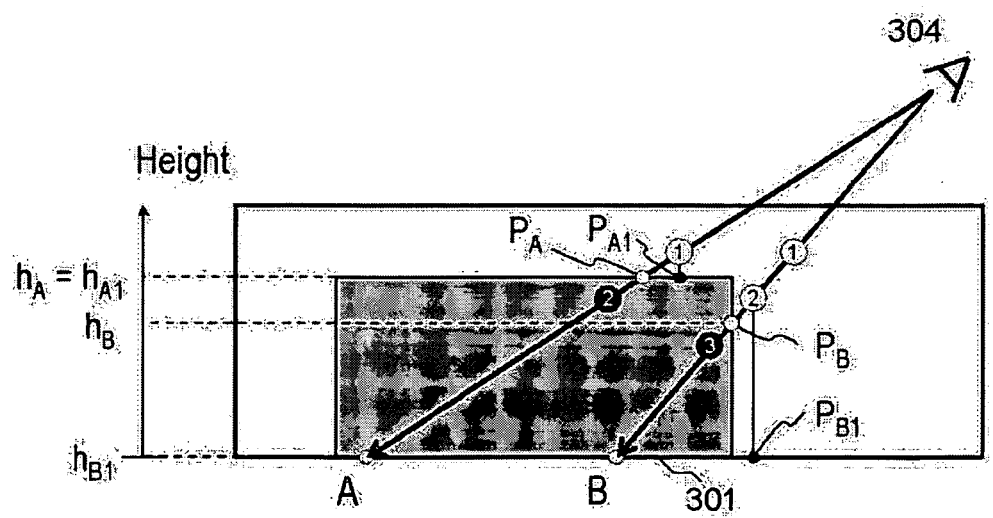
FIG. 14 is a diagram showing the process of determining a steep displacement and a gentle displacement.

If the protruding shape having a steep inclination is magnified, the vertically protruding hexahedral shape of FIG. 14 can be assumed. If the vertically protruding hexahedral shape can be accurately represented, it is possible to represent any protruding shape having a steeply inclined surface.

FIG. 7F illustrates a structure in which texture information is added to the sides of a box in the results of FIG. 7E. In this case, since the sides of the box are perpendicular to the polygonal surface, a single pixel on texture coordinates represents all points ranging from the lowest point to the height point on the sides of the box. Therefore, the box is represented as a shape in which a texture is vertically applied to the sides of the box, as shown in FIG. 7E. The boundary between the background 701 and the texture 702 of FIG. 7A represents all sides of the protruding shape of FIG. 7E. Since fine errors may occur during a pixel-based sequential search procedure and a binary search procedure, effects, similar to those appearing in the case where pixels existing near black segments corresponding to the boundary are linearly interpolated on all sides of the box, can be actually obtained.

If a protruding shape is divided into the sides of a box (steeply inclined surfaces) and the top surface (gently inclined surface) thereof, additional texture information is applied to the steeply inclined surface, at which serious distortion occurs, thus correcting distortion occurring on the sides of the box.

For this operation, a steeply inclined surface and a gently inclined surface of a protruding shape must be separated.

The detection of a steeply inclined surface can be performed using the following method. The structure of FIG. 14 is similar to the section of the displacement map used in FIG. 7. In the case of point $P_A$, existing on a gently inclined surface, the value of the displacement map on uv coordinates at point ① is read in a sequential search procedure, and thus $h_{A1}$ is detected as a height value at point $P_{A1}$. At the subsequent step, the height value at point ② is determined to be less than the value read from the displacement map, so that sequential search is stopped. Thereafter, the exact intersection point obtained at the binary search procedure is $P_A$, and the height of this point is determined to be $h_A$. In this case, the height $h_A$ of the point $P_A$ existing on the surface having a gentle inclination has a value similar to $h_{A1}$.

Meanwhile, in the case of point $P_B$, existing on a steeply inclined surface, the following results can be obtained. At the sequential search procedure, a height value $h_{B1}$ read from the displacement map with respect to point ② is placed on the bottom surface. At the subsequent step, the height value at point ③ is less than the value read from the displacement map (equal to $h_{A1}$), so that a sequential search is stopped. After that, the height value of the intersection point $P_B$, obtained in the binary search procedure, is determined to be $h_B$. In this case, the height $h_B$ of the point $P_B$ placed on the steeply inclined surface has a large difference with respect to $h_{B1}$.

As described above, the point placed on a steeply inclined surface can be separated using the difference between two cases. The separation procedure is described as follows.

First, the value $h_{n-1}$ of the displacement map, read from coordinates immediately before detection is terminated in the sequential search procedure, is stored.

Second, the height value h of the intersection point obtained as the result of binary search is obtained.

Third, if the difference $h_{n-1}$–h between two height values is greater than a threshold value (delta), a corresponding point is determined to be a point placed on the surface having a steep inclination. If the difference between two height values is less than the threshold value, a corresponding point is determined to be a point placed on the surface having a gentle inclination.

A tile-shaped texture occupying a small amount of memory can be mapped onto the steeply inclined surface, detected through the above method, using uv coordinates and the detected height value. In this case, if the coordinate system of the tile-shaped texture represents two-dimensional coordinates of x and y, the details of an inclined surface relative to steep displacement can be added using the following Equation [3], $$x = scale\_x \times d$$

$$y = scale\_y \times h$$

$$d = f(u,v) \quad [3]$$

where u and v denote u and v coordinates of each pixel existing on a polygonal surface, and h is the height value of the intersection point obtained in the protruded displacement mapping procedure.

Color information is sampled from the tile-shaped texture using x and y values calculated by Equation [3], and the sampled color information is used as the color value of each pixel on the steeply inclined surface.

However, the above Equation [3] is only an embodiment of additional texture mapping for a steep displacement. In particular, d is suitably modified according to the shape of an object and is defined and used by a function of u and v. As the simplest example, it is possible to use d=u+v as a linear combination of u and v. The subsequent procedure for obtaining color information from the obtained x and y values is similar to a typical texture sampling procedure.

The results obtained by applying a tile-shaped texture to a steeply inclined surface are shown in FIG. 7F.

This method can be used in the representation of a vertically protruding object, such as a building.

In this case, a threshold value (delta) for determining a steeply inclined surface and a gently inclined surface must be suitably adjusted according to the resolution of a screen and a displacement map. If the threshold value (delta) is set to an excessively low value, even a flat surface is determined to be a steeply inclined surface, and thus a problem in which pixels determined to exist on an inclined surface are mixed with pixels on a flat surface occurs. Such a problem becomes serious when fine errors exist in the values of the displacement map. In this case, errors are removed by adjusting the threshold value (delta).

Bi-layered Displacement Mapping Method

Figure 15:
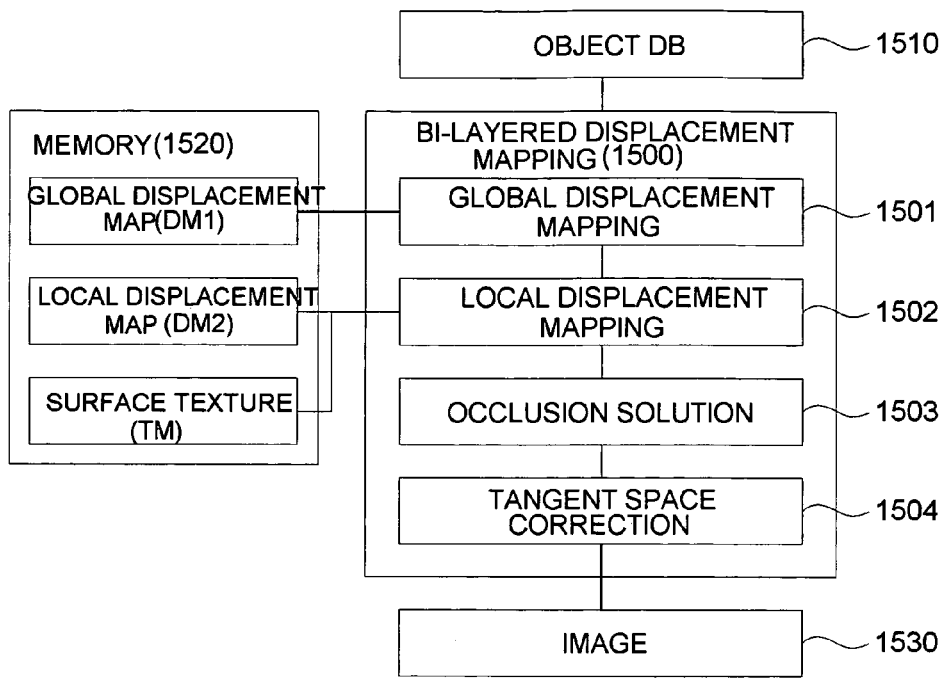
FIG. 15 is a functional block diagram showing a system for performing bi-layered displacement mapping according to the present invention.

FIG. 15 is a diagram showing a system for performing bi-layered displacement mapping according to the present invention.

A bi-layered displacement mapping system 1500 according to the present invention includes a polygon-based global displacement mapping means 1501, and a local displacement mapping means 1502 for representing the details of a polygonal surface. The global displacement mapping means 1501 is provided with global displacement information by a global displacement map DM1, and the local displacement mapping means 1502 is provided with local displacement information by a local displacement map DM2. Further, the local displacement mapping means 1502 is provided with texture information TM.

The bi-layered displacement mapping system 1500 according to the present invention receives information about an object to be rendered from an object database (DB) 1510 of a computer graphic system, and receives the global displacement map DM1, the local displacement map DM2, and the texture information TM, which are to be used for displacement mapping, from memory 1520, thus rendering the surface of the object in detail, and consequently generating an image 1530 in real time.

The global displacement mapping means 1501 is used to represent the gentle displacement of an object. The heights of vertices constituting the surface of the object are adjusted using a polygon-based triangle mesh generation method from the global displacement map DM1 of FIG. 15, thus the details of the surface are represented. In this case, polygon-based displacement mapping is used, and the number of vertices can be increased to represent minute details.

The local displacement mapping means 1502 is used to represent more detailed displacement, which cannot be represented by the global displacement mapping means 1501. The local displacement mapping means 1502 performs a displacement mapping method to represent a protruding or depressed shape on a polygonal surface. The image-based protruded displacement mapping method proposed according to the present invention in FIG. 4 is applied to the protruding shape, so that the steep displacement and detailed shape of an object surface are represented, without micropolygons being added.

The local displacement mapping means of the present invention performs a protruded displacement mapping method on a protruding shape.

When an image is displayed on the screen after the polygon-based global displacement mapping and local displacement mapping on the polygonal surface have been performed, an occlusion solution procedure 1503 for protruding shapes and a tangent space correction procedure 1504 are performed.

First, the occlusion solution procedure 1503 for protruding shapes is described.

The solution of the occlusion of protruding shapes is performed by conducting displacement mapping so that displacement mapping on a polygonal surface far away from a viewpoint is performed earlier and displacement mapping on a polygonal surface dose to the viewpoint is performed later. Through this procedure, the polygonal surface far away from the viewpoint is hidden by the polygonal surface dose to the viewpoint.

Next, the necessity and method for the tangent space correction procedure 1504 are described.

If protruded displacement mapping is applied to a flat polygonal surface, a displacement map is placed in a plane having the same normal, so that tangent spaces are equal with respect to all pixels. However, for bi-layered displacement mapping, if protruded displacement mapping is applied to a curved surface, which has the shape of a grid or Triangular Irregular Networks (TIN) and to which global displacement mapping is applied, an error occurs in the protruding shape due to the difference between the directions of the normals of adjacent polygons. In order to solve such a problem, bi-layered displacement mapping corrects tangent spaces. The correction of the tangent spaces is performed by executing the operation of equalizing the heights of tangent spaces between adjacent polygons.

The above-described occlusion solution procedure and tangent space correction procedure can be included in the bi-layered displacement mapping method or the distributed displacement mapping method of FIG. 4, as described above.

Embodiment

The present invention can be applied to entertainment information devices, including video game machines and computer game programs, information devices for representing geo-spatial information, and information devices for generating images through computer graphic rendering.

Figure 16:
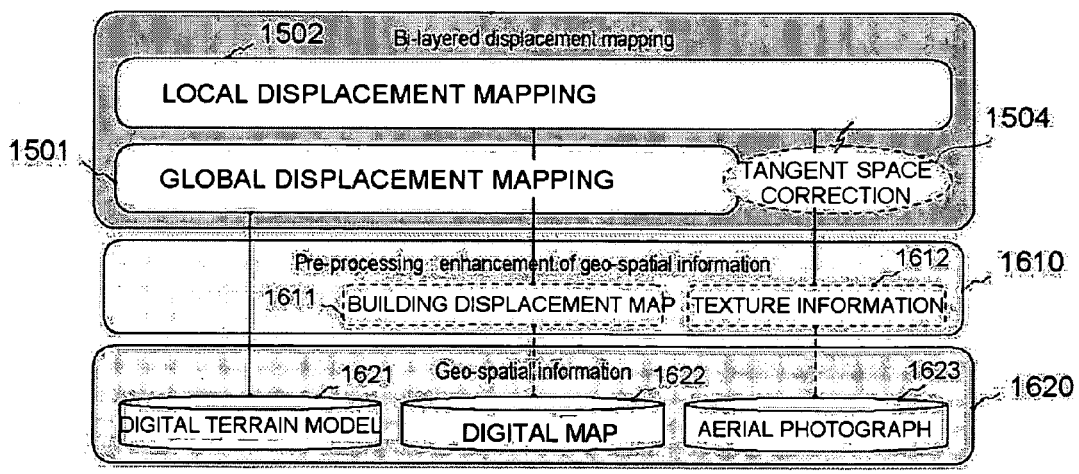
FIG. 16 is a diagram showing an example in which bi-layered displacement mapping and protruded displacement mapping of the present invention are utilized for representing geo-spatial information.

In particular, if the present invention is applied to the modeling and visualization of actual geo-spatial information, the structure of FIG. 16 can be obtained. In order to represent an urban topographical model using displacement mapping, the ability to represent both a relatively large displacement of base terrain and a relatively small displacement of structures is required. In the characteristics of geographical information, when the displacement of base terrain and the displacement of structures, such as buildings, are represented together, it is difficult to represent the exact shape of each building. It is beneficial to separate the displacement of a building from the displacement of base terrain from the standpoint of supply and visualization of geographical information. Therefore, after global displacement mapping using base terrain and local displacement mapping using the height of buildings have been separately performed, the two displacements are combined with each other.

For global displacement mapping and local displacement mapping, constituting bi-layered displacement mapping, displacement mapping methods suitable for respective purposes thereof are required. From the standpoint of modeling and visualization, it is preferable to use methods suitable for the two respective stages of displacement mapping. In the present invention, displacement mapping methods are used together in such a way that shape-based global displacement mapping is used to represent terrain, and image-based protruded displacement mapping is used to represent protruding buildings.

For modeling and representation of a virtual urban environment, as shown in FIG. 16, displacement mapping methods are classified into global displacement mapping 1501 for representing base terrain, and local displacement mapping 1502 for representing structures, such as buildings, so that bi-layered displacement mapping can be applied. Base terrain, represented only by the height of the surface of the earth, other than artificial structures, such as buildings, varies independent of time, whereas buildings vary continuously and relatively quickly according to variation in the urban environment, so that a building displacement map 1611 required for local displacement mapping must be updated more frequently. Therefore, the building displacement map 1611 for storing artificial structure information and a digital terrain model 1621 for storing base terrain information are separated from each other, so that the present invention can easily cope with variation in the urban environment. That is, only the building displacement map 1611, generated from a digital map 1622, is updated, thus it is possible to simply update a virtual urban environment.

The bi-layered displacement mapping method of FIG. 16 uses a method of representing the height of terrain using the global displacement mapping 1501 with respect to base terrain, and representing the height of a building shape using the local displacement mapping 1502, thus separating buildings, which frequently vary, and base terrain which does not frequently vary. The global displacement mapping 1501 represents the displacement of base terrain from the digital terrain model 1621. Above the global placement mapping 1501, local displacement mapping 1502 representing the protruding details of a building is performed using the building displacement map 1611, generated from the digital map 1622, and texture information 1612 using an aerial photograph 1623.

Figure 17:
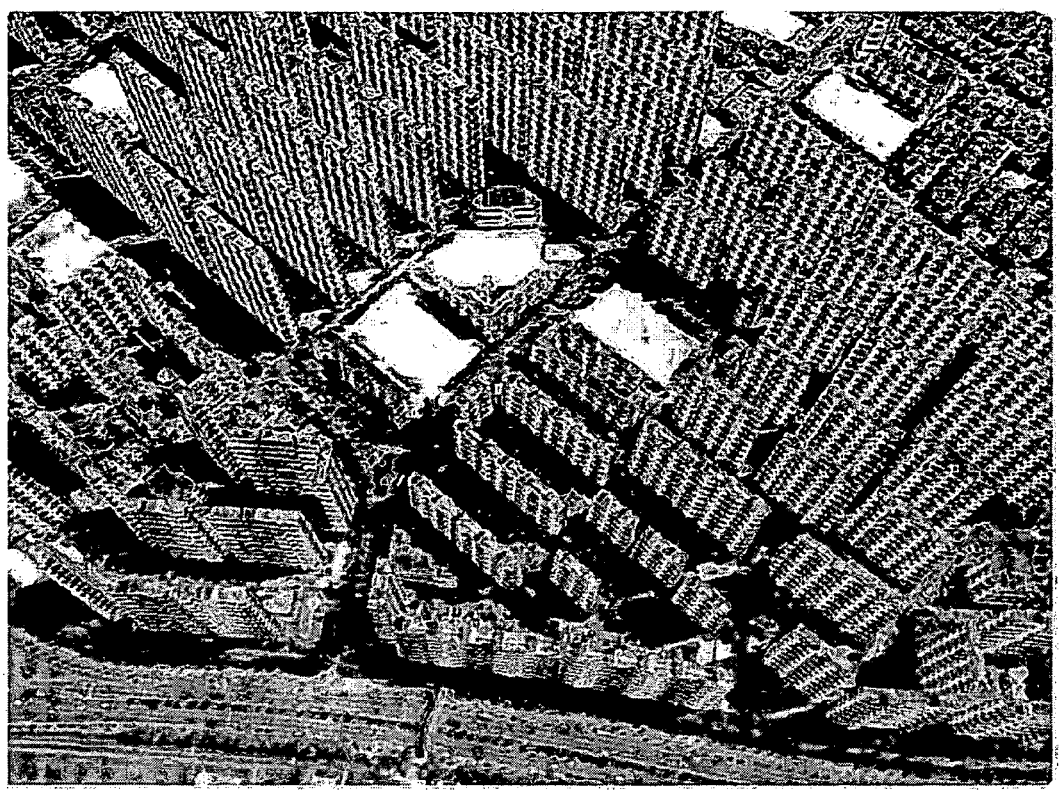
FIG. 17 is a view showing an image generated by the example of FIG. 16 in real time.

As the result of applying the bi-layered displacement mapping and protruded displacement mapping, described in the present invention, to the representation of actual geo-spatial information, as shown in FIG. 16, the image of FIG. 17 was generated in real time.

As described above, the present invention can accurately represent the silhouette of a shape protruding from an actual polygonal surface. The present invention can define a displacement map to represent a shape protruding from an actual polygonal surface and can represent the silhouette of the protruding shape, unlike conventional image-based displacement mapping methods using GPU, which can represent only shapes depressed from a reference surface. Further, the present invention adds only two auxiliary surfaces without modifying the shape of a polygonal surface, thus representing the details of the protruding shape without increasing the number of vertices of all models.

Furthermore, the protruded displacement mapping of the present invention adds the details of inclined surfaces to a pixel-based calculation procedure, so that it is possible to represent a protruding shape having a steep inclination. Since the details of the steeply inclined surface use a very small tile-shaped texture, they do not influence rendering performance.

Further, the protruded displacement mapping method of the present invention can be applied to a vertically protruding shape, such as a multistoried building, can be used together with a graphic algorithm based on a polygon model, and can be utilized for improving the representation of geo-spatial information. Accordingly, the present invention is advantageous in that details can be added to the surface of an object at the time that an image is represented in an entertainment information device, including a video game machine and a computer game program, or an information device using computer graphics, thus the protruded displacement mapping can also be used to improve image quality.

The present invention is advantageous in that it can represent a protruding shape and the silhouette thereof without adding micro-polygons to the surface of an object.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An image-based protruded displacement mapping method in a system for representing a shape of an object protruding from a polygonal surface using a three-dimensional object, texture information and displacement information, comprising:
    an intersection point search step of searching for an intersection point of a surface of a protruding object, defined by the displacement information, and an observer's sight line, and displaying the shape of the protruding object on the polygonal surface;
    an overflow representation step of adding a separate polygonal surface and representing a shape of the protruding object, corresponding to overflow deviating from a boundary of the polygonal surface, on the added polygonal surface;
    a steeply inclined surface step of detecting a steeply inclined surface in the shape of the protruding object; and
    a steeply inclined surface correction step of representing an additional texture on the steeply inclined surface.

2. The image-based protruded displacement mapping method according to claim 1, wherein the intersection point search step comprises:
    a sequential search step of detecting an approximate location of the intersection point of the surface of the object, defined by the displacement information, and the sight line; and
    a binary search step of detecting an exact location of the intersection point and a height of the intersection point in the approximate location of the intersection point.

3. The image-based protruded displacement mapping method according to claim 2, wherein the sequential search step comprises the steps of:
    dividing a region between a top surface of a virtual volume, constructed by the displacement information, and the polygonal surface into regular intervals;
    detecting division intersection points at which the top surface and divided surfaces of the virtual volume and the sight line intersect;
    comparing a height value of each divided surface with a height value stored in the displacement information, in a sequence from an uppermost division intersection point to a lowermost division intersection point, continuing an inspection for a subsequent division intersection point if the height value of the divided surface is greater than the height value stored in the displacement information, and stopping the inspection if the height value of the divided surface is less than the height value stored in the displacement information; and
    setting a region between the division intersection point, at which the inspection is stopped, and a division intersection point immediately above the division intersection point to an approximate location of the intersection point.

4. The image-based protruded displacement mapping method according to claim 1, wherein the overflow representation step is performed so that the polygonal surface extends in an identical plane, and the shape of the protruding object corresponding to the overflow is represented on the extending polygonal surface.

5. The image-based protruded displacement mapping method according to claim 1, wherein the overflow representation step is performed so that a surface perpendicular to the polygonal surface is added at a boundary of the polygonal surface at which overflow occurs depending on a direction of the sight line, and the shape of the protruding object corresponding to the overflow is represented on the added perpendicular surface.

6. The image-based protruded displacement mapping method according to claim 5, wherein the overflow representation step is performed to map tangent spaces of the polygonal surface and the perpendicular surface.

7. The image-based protruded displacement mapping method according to claim 5, wherein the overflow representation step is performed so that, if it is assumed that space coordinates at an intersection point C of the sight line and the perpendicular surface are dx and dy, and space coordinates at an intersection point A of a virtual extending surface, obtained by extending the polygonal surface in an identical plane, and the sight line are x' and y', the point C is mapped onto the point A using the following equation, and the shape of the protruding object is represented using texture coordinates at the point A:

$$x' = \frac{dx \times vx}{vz}, \quad y' = \frac{dx \times vy}{vz} + dy$$

where vx, vy and vz are tangent space coordinates on the polygonal surface, dx and dy are uv space coordinates on the perpendicular surface, and x' and y' are space coordinates on the virtual extending surface.

8. The image-based protruded displacement mapping method according to claim 1, wherein the overflow representation step is performed to render only the shape of the protruding object corresponding to the overflow, without representing the added polygonal surface.

9. The image-based protruded displacement mapping method according to claim 1, wherein the steeply inclined surface step comprises the steps of
    dividing the region between the top surface of the virtual volume, constructed by the displacement information, and the polygonal surface into regular intervals;
    detecting division intersection points at which the top surface and divided surfaces of the virtual volume and the sight line intersect;
    obtaining a height value of an intersection point of the surface of the object defined by the displacement information and the sight line, and setting the height value to a first height value;
    obtaining a height value of a division intersection point existing on an upper surface close to the intersection point, and setting the obtained height value to a second height value; and
    determining that a corresponding surface is a steeply inclined surface if a difference between the first and second height values is greater than a threshold value.

10. The image-based protruded displacement mapping method according to claim 1, wherein the steeply inclined surface correction step is performed to add a tile-shaped texture to the steeply inclined surface.

11. The image-based protruded displacement mapping method according to claim 1, further comprising an occlusion solution step of arranging a plurality of objects, for which the steeply inclined surface correction step has been performed, in a sequence of distances to a viewpoint.

12. A bi-layered displacement mapping method in a system for representing a shape of each object using a three-dimensional object, texture information, global displacement information and local displacement information, comprising:

a global displacement mapping step of representing the surface of the object based on a polygon using the three-dimensional object and the global displacement information;

a local displacement mapping step of representing detailed shapes of the object using the texture information and the local displacement information;

an occlusion solution step of arranging objects, for which the global displacement mapping and the local displacement mapping have been performed, in a sequence of distances to a viewpoint; and a tangent space correction step of equalizing heights of tangent spaces between adjacent polygons at the global displacement mapping step.

13. The bi-layered displacement mapping method according to claim 12, wherein the local displacement mapping step comprises:

an intersection point search step of searching for an intersection point of a surface of a protruding object, defined by the local displacement information, and an observer's sight line, and displaying the shape of the protruding object on the polygonal surface;

an overflow representation step of adding a separate polygonal surface and representing a shape of the protruding object, corresponding to overflow deviating from a boundary of the polygonal surface, on the added polygonal surface;

a steeply inclined surface step of detecting a steeply inclined surface in the shape of the protruding object;

a steeply inclined surface correction step of representing an additional texture on the steeply inclined surface.

14. The bi-layered displacement mapping method according to claim 13, wherein the intersection point search step comprises:

a sequential search step of detecting an approximate location of the intersection point of the surface of the object, defined by the displacement information, and the sight line; and a binary search step of detecting an exact location of the intersection point and a height of the intersection point in the approximate location of the intersection point.

15. The bi-layered displacement mapping method according to claim 14, wherein the sequential search step comprises the steps of:

dividing a region between a top surface of a virtual volume, constructed by the local displacement information, and the polygonal surface into regular intervals;

detecting division intersection points at which the top surface and divided surfaces of the virtual volume and the sight line intersect;

comparing a height value of each divided surface with a height value, stored in the displacement information, in a sequence from an uppermost division intersection point to a lowermost division intersection point, continuing an inspection for a subsequent division intersection point if the height value of the divided surface is greater than the height value stored in the displacement information, and stopping the inspection if the height value of the divided surface is less than the height value stored in the displacement information; and setting a region between the division intersection point, at which the inspection is stopped, and a division intersection point immediately above the division intersection point to an approximate location of the intersection point.

16. The bi-layered displacement mapping method according to claim 13, wherein the overflow representation step is performed so that the polygonal surface extends in an identical plane, and the shape of the protruding object corresponding to the overflow is represented on the extending polygonal surface.

17. The bi-layered displacement mapping method according to claim 13, wherein the overflow representation step is performed so that a surface perpendicular to the polygonal surface is added at a boundary of the polygonal surface at which overflow occurs depending on a direction of the sight line, and the shape of the protruding object corresponding to the overflow is represented on the added perpendicular surface.

18. The bi-layered displacement mapping method according to claim 17, wherein the overflow representation step is performed to map tangent spaces of the polygonal surface and the perpendicular surface.

19. The bi-layered displacement mapping method according to claim 17, wherein the overflow representation step is performed so that, if it is assumed that space coordinates at an intersection point C of the sight line and the perpendicular surface are dx and dy, and space coordinates at an intersection point A of a virtual extending surface, obtained by extending the polygonal surface in an identical plane, and the sight line are x' and y', the point C is mapped onto the point A using the following equation, and the shape of the protruding object is represented using texture coordinates at the point A:

$$x' = \frac{dx \times vx}{vz}, \quad y' = \frac{dx \times vy}{vz} + dy$$

where vx, vy and vz are tangent space coordinates on the polygonal surface, dx and dy are uv space coordinates on the perpendicular surface, and x' and y' are space coordinates on the virtual extending surface.

20. The bi-layered displacement mapping method according to claim 13, wherein the overflow representation step is performed to render only the shape of the protruding object corresponding to the overflow, without representing the added polygonal surface.

21. The bi-layered displacement mapping method according to claim 13, wherein the steeply inclined surface step comprises the steps of:

dividing the region between the top surface of the virtual volume, constructed using the local displacement information, and the polygonal surface into regular intervals;

detecting division intersection points at which the top surface and divided surfaces of the virtual volume and the sight line intersect;

obtaining a height value of an intersection point of the surface of the object defined by the local displacement information and the sight line, and setting the height value to a first height value;

obtaining a height value of a division intersection point existing on an upper surface dose to the intersection point, and setting the obtained height value to a second height value; and determining that a corresponding surface is a steeply inclined surface if a difference between the first and second height values is greater than a threshold value.

22. The bi-layered displacement mapping method according to claim 13, wherein the steeply inclined surface correction step is performed to add a tile-shaped texture to the steeply inclined surface.

23. The bi-layered displacement mapping method according to claim 12, wherein the global displacement information is base terrain information, the local displacement information is artificial structure information, and texture information is information about an aerial photograph.

24. A method of processing overflow, which deviates from a boundary of a polygonal surface, in a computer graphic system for performing polygon-based global displacement mapping and local displacement mapping of representing detailed shapes of a surface of an object based on texture on the polygonal surface for which the global displacement mapping has been performed, comprising the steps of:

adding a surface perpendicular to the polygonal surface at a boundary of the polygonal surface at which the overflow occurs depending on a direction of the sight line; and representing the shape of the protruding object corresponding to the overflow on the added perpendicular surface.

25. The overflow processing method according to claim 24, wherein tangent spaces of the polygonal surface and the perpendicular surface are mapped onto each other.

26. The overflow processing method according to claim 24, wherein the overflow is represented so that, if it is assumed that space coordinates at an intersection point C of the sight line and the perpendicular surface are dx and dy, and space coordinates at an intersection point A of a virtual extending surface, obtained by extending the polygonal surface in an identical plane, and the sight line are x' and y', the point C is mapped onto the point A using the following equation, and the shape of the protruding object is represented using texture coordinates at the point A:

$$x' = \frac{dx \times vx}{vz}, \quad y' = \frac{dx \times vy}{vz} + dy$$

where vx, vy and vz are tangent space coordinates on the polygonal surface, dx and dy are uv space coordinates on the perpendicular surface, and x' and y' are space coordinates on the virtual extending surface.

27. The overflow processing method according to claim 24, wherein only the shape of the protruding object corresponding to the overflow is rendered, without representing the added polygonal surface.

\* \* \* \* \*

UNITED STATES PATENT AND TRADEMARK OFFICE
CERTIFICATE OF CORRECTION

PATENT NO. : 7,629,972 B2  Page 1 of 1
APPLICATION NO. : 11/510255
DATED : December 8, 2009
INVENTOR(S) : Yoo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 630 days.

Signed and Sealed this

Second Day of November, 2010

David J. Kappos
*Director of the United States Patent and Trademark Office*